United States Patent
Goyal et al.

(10) Patent No.: US 7,562,389 B1
(45) Date of Patent: *Jul. 14, 2009

(54) METHOD AND SYSTEM FOR NETWORK SECURITY

(75) Inventors: Rajan Goyal, Sunnyvale, CA (US); Virgil N. Mihailovici, San Jose, CA (US); Rahul Gupta, Sunnyvale, CA (US); Pere Monclus, San Jose, CA (US); Ahsan Habib, Los Gatos, CA (US); Kirtikumar L. Prabhu, San Jose, CA (US); Christophe J. Paggen, Plainevaux (BE); Shyamasundar S. Kaluve, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 10/903,391

(22) Filed: Jul. 30, 2004

(51) Int. Cl.
*G06F 11/00* (2006.01)
*H04L 9/00* (2006.01)

(52) U.S. Cl. .............. 726/22; 726/11; 726/12; 713/153; 713/154

(58) Field of Classification Search ......... 726/11–12, 726/22; 713/153–154; 709/238–244; 370/355, 370/359, 401
See application file for complete search history.

(56) References Cited

U.S. PATENT DOCUMENTS

| | | | |
|---|---|---|---|
| 3,974,328 A | 8/1976 | Thomas et al. | 178/6.8 |
| 4,103,847 A | 8/1978 | Thomas et al. | 244/3.18 |
| 4,286,261 A | 8/1981 | Wagner et al. | 340/565 |
| 4,931,740 A | 6/1990 | Hassanzadeh et al. | 324/457 |
| 4,991,146 A | 2/1991 | Ransdell et al. | 367/98 |
| 5,311,510 A | 5/1994 | Moriue et al. | 370/428 |
| 5,557,742 A | 9/1996 | Smaha et al. | 395/186 |
| 5,963,556 A * | 10/1999 | Varghese et al. | 370/401 |
| 6,035,405 A | 3/2000 | Gage et al. | 713/201 |
| 6,279,113 B1 * | 8/2001 | Vaidya | 726/23 |
| 6,477,651 B1 | 11/2002 | Teal | 713/200 |

(Continued)

OTHER PUBLICATIONS

PCT, Notification of Transmittal of the International Search Report and the Written Opinion of the International Searching Authority, or the Declaration, PCT/US05/24592, 7 pages, Mailed Jul. 20, 2006.

(Continued)

*Primary Examiner*—Minh Dieu Nguyen
(74) *Attorney, Agent, or Firm*—Baker Botts L.L.P.

(57) ABSTRACT

In accordance with one embodiment of the present invention, a method includes receiving a packet at a physical interface of a network security gateway. The packet is tagged with a first VLAN identifier associated with an external network. The method also includes communicating a copy of the packet to a first processor, analyzing the copy of the packet at the first processor to determine whether the packet violates a security condition, and communicating a reply message from the first processor to the interface. The reply message indicates whether the packet violates a security condition. If the packet does not violate a security condition, the method includes re-tagging the packet with a second VLAN identifier associated with a protected network by using a second processor at the physical interface. The method further includes communicating the re-tagged packet to the protected network if the packet does not violate a security condition.

29 Claims, 2 Drawing Sheets

U.S. PATENT DOCUMENTS

| | | | |
|---|---|---|---|
| 6,487,666 B1 | 11/2002 | Shanklin et al. | 713/201 |
| 6,560,236 B1* | 5/2003 | Varghese et al. | 370/401 |
| 6,584,565 B1 | 6/2003 | Zamek | 713/156 |
| 6,647,400 B1 | 11/2003 | Moran | 707/205 |
| 6,715,084 B2 | 3/2004 | Aaron et al. | 713/201 |
| 6,785,821 B1 | 8/2004 | Teal | 713/200 |
| 6,792,546 B1 | 9/2004 | Shanklin et al. | 713/201 |
| 6,826,697 B1 | 11/2004 | Moran | 713/201 |
| 6,898,632 B2 | 5/2005 | Gordy et al. | 709/224 |
| 6,928,549 B2 | 8/2005 | Brock et al. | 713/194 |
| 6,950,628 B1 | 9/2005 | Meier et al. | 455/41.2 |
| 6,996,843 B1 | 2/2006 | Moran | 726/23 |
| 7,032,114 B1 | 4/2006 | Moran | 713/187 |
| 7,051,365 B1* | 5/2006 | Bellovin | 726/11 |
| 7,076,803 B2 | 7/2006 | Bruton et al. | 726/23 |
| 7,107,612 B1 | 9/2006 | Xie et al. | 126/13 |
| 7,150,043 B2 | 12/2006 | Brock et al. | 726/23 |
| 7,177,295 B1* | 2/2007 | Sholander et al. | 370/338 |
| 7,222,366 B2 | 5/2007 | Bruton et al. | 726/23 |
| 7,281,269 B1 | 10/2007 | Sievers et al. | 726/24 |
| 7,310,815 B2 | 12/2007 | Yanovsky | 726/13 |
| 7,331,061 B1 | 2/2008 | Ramsey et al. | 726/23 |
| 2002/0009078 A1 | 1/2002 | Wilson et al. | 370/389 |
| 2002/0069356 A1 | 6/2002 | Kim | 713/160 |
| 2002/0073337 A1 | 6/2002 | Ioele et al. | 713/201 |
| 2002/0101870 A1 | 8/2002 | Chase et al. | 370/389 |
| 2002/0107961 A1 | 8/2002 | Kinoshita | 709/225 |
| 2002/0143948 A1* | 10/2002 | Maher et al. | 709/226 |
| 2003/0009693 A1 | 1/2003 | Brock et al. | 713/201 |
| 2003/0014662 A1 | 1/2003 | Gupta et al. | 713/200 |
| 2003/0061514 A1 | 3/2003 | Bardsley et al. | 713/201 |
| 2003/0069972 A1 | 4/2003 | Yoshimura et al. | 709/226 |
| 2003/0084318 A1 | 5/2003 | Schertz | 713/200 |
| 2003/0084321 A1 | 5/2003 | Tarquini et al. | 713/200 |
| 2003/0084328 A1 | 5/2003 | Tarquini et al. | 713/200 |
| 2003/0084329 A1 | 5/2003 | Tarquini | 713/200 |
| 2003/0084344 A1 | 5/2003 | Tarquini et al. | 713/201 |
| 2003/0110393 A1 | 6/2003 | Brock et al. | 713/200 |
| 2003/0145225 A1 | 7/2003 | Bruton, III et al. | 713/201 |
| 2003/0145226 A1 | 7/2003 | Bruton, III et al. | 713/200 |
| 2003/0149887 A1 | 8/2003 | Yadav | 713/200 |
| 2003/0154399 A1* | 8/2003 | Zuk et al. | 713/201 |
| 2003/0188190 A1 | 10/2003 | Aaron et al. | 713/201 |
| 2003/0188191 A1 | 10/2003 | Aaron et al. | 713/201 |
| 2003/0236992 A1 | 12/2003 | Yami | 713/200 |
| 2004/0030927 A1* | 2/2004 | Zuk | 713/201 |
| 2004/0049596 A1 | 3/2004 | Schueler et al. | 709/238 |
| 2004/0049693 A1 | 3/2004 | Douglas | 713/200 |
| 2004/0059942 A1 | 3/2004 | Xie | 713/201 |
| 2004/0083295 A1 | 4/2004 | Amara et al. | 709/229 |
| 2004/0093513 A1 | 5/2004 | Cantrell et al. | 713/201 |
| 2004/0117478 A1 | 6/2004 | Triuzi et al. | 709/224 |
| 2004/0202157 A1 | 10/2004 | Chase et al. | 370/389 |
| 2004/0221171 A1 | 11/2004 | Ahmed et al. | 713/200 |
| 2004/0221178 A1 | 11/2004 | Aaron et al. | 713/201 |
| 2004/0255154 A1 | 12/2004 | Kwan et al. | 713/201 |
| 2004/0260945 A1 | 12/2004 | Raikar et al. | 713/201 |
| 2005/0005031 A1 | 1/2005 | Gordy et al. | 709/250 |
| 2005/0018618 A1* | 1/2005 | Mualem et al. | 370/252 |
| 2005/0022018 A1 | 1/2005 | Szor | 713/201 |
| 2005/0044199 A1 | 2/2005 | Shiga et al. | 709/223 |
| 2005/0058132 A1 | 3/2005 | Okano et al. | 370/389 |
| 2005/0071642 A1 | 3/2005 | Moghe et al. | 713/182 |
| 2005/0071643 A1 | 3/2005 | Moghe | 713/182 |
| 2005/0071644 A1 | 3/2005 | Moghe et al. | 713/182 |
| 2005/0076245 A1 | 4/2005 | Graham et al. | 713/201 |
| 2005/0081058 A1 | 4/2005 | Chang et al. | 713/201 |
| 2005/0097358 A1 | 5/2005 | Yanovsky | 713/201 |
| 2005/0132230 A1 | 6/2005 | Miclea et al. | 713/201 |
| 2005/0157653 A1* | 7/2005 | Zeitak et al. | 370/241 |
| 2005/0185626 A1 | 8/2005 | Meier et al. | 370/338 |
| 2005/0193429 A1* | 9/2005 | Demopoulos et al. | 726/23 |
| 2005/0216770 A1 | 9/2005 | Rowett et al. | 713/201 |
| 2005/0226257 A1 | 10/2005 | Mirzabegian et al. | 370/401 |
| 2005/0229246 A1 | 10/2005 | Rajagopal et al. | 726/14 |
| 2005/0259646 A1 | 11/2005 | Smith et al. | 370/389 |
| 2005/0278178 A1 | 12/2005 | Girouard et al. | 704/270 |
| 2005/0283831 A1 | 12/2005 | Ryu et al. | 726/11 |
| 2006/0007903 A1* | 1/2006 | Hammell et al. | 370/342 |
| 2006/0023709 A1 | 2/2006 | Hall et al. | 370/389 |
| 2006/0085855 A1 | 4/2006 | Shin et al. | 726/23 |
| 2006/0161983 A1 | 7/2006 | Cothrell et al. | 726/23 |
| 2007/0058551 A1* | 3/2007 | Brusotti et al. | 370/241 |

OTHER PUBLICATIONS

USPTO; Office Action (by Examiner Matthew Smithers); for U.S. Appl. No. 10/910,194,; (5 pages), transmitted Dec. 13, 2007.

USPTO; Office Action (by Examiner David Cervetti); for U.S. Appl. No. 11/039,219,; (14 pages), transmitted Jul. 21, 2008.

Cisco Pix Firewall and VPN Configuration Guide, Ver. 6.3 Cisco Systems (466 pages).

Cisco Router and Security Device Manager Firewall Policy Management Application Note, Cisco Systems, (19 pages), 2004.

Cisco IOS Firewall Design Guide, Cisco Systems (60 pages), 1992-2005.

Cisco Secure Policy Manager Solution Guide Series: Intrusion Detection System, Ver. 2.3.1i (175 pages), Jul. 2001,

* cited by examiner

United States Patent US 7,562,389 B1

METHOD AND SYSTEM FOR NETWORK SECURITY

TECHNICAL FIELD OF THE INVENTION

The present invention relates generally to the field of network security, and more particularly a method and system for network security.

BACKGROUND OF THE INVENTION

A network has many resources which are vulnerable to attacks from external networks, so developers have created mechanism for protecting against such attacks. Resources may include servers, printers, network hardware and software, and others. Network Security Gateways (NSGs), which sit on the edge of protected and external networks, provide security to a protected network and generally operate in one of two modes. In "promiscuous" mode, besides sending packets between an external and protected network, the NSG monitors copies of incoming network traffic for intrusion pattern characteristics and generates alarms in response to detecting such patterns. In "inline" mode, network traffic is scanned prior to being passed to a protected network by the NSG to determine whether it contains a hostile signature. In addition to generating alarms in the inline mode, the NSG can prevent traffic from reaching the protected network. If either actuation is detected, the NSG prevents the network from receiving the traffic. Generally, NSGs operating in the inline mode have two physical ports, one coupled to the outside network and one coupled to the protected network. On the other hand, NSGs operating in promiscuous mode only need one physical port to received network traffic.

SUMMARY OF THE INVENTION

In accordance with one embodiment of the present invention, a method includes receiving a packet at a physical interface of a network security gateway. The packet is tagged with a first VLAN identifier associated with an external network. The method also includes communicating a copy of the packet to a first processor, analyzing the copy of the packet at the first processor to determine whether the packet violates a security condition, and communicating a reply message from the first processor to the interface. The reply message indicates whether the packet violates a security condition. If the packet does not violate a security condition, the method includes re-tagging the packet with a second VLAN identifier associated with a protected network by using a second processor at the physical interface. The method further includes communicating the re-tagged packet to the protected network if the packet does not violate a security condition.

In accordance with another embodiment of the present invention, a network security gateway includes an interface operable to receive a packet tagged with a first VLAN identifier associated with an external network. The interface is further operable to communicate a copy of the packet to a processor and re-tag the packet with a second VLAN identifier associated with a protected network. The interface is further operable to communicate the packet to the protected network. The network security gateway also includes a processor operable to analyze the copy of the packet to determine if it violates a security condition and communicate a reply message to the interface. The reply message indicates whether the packet violates a security condition. The interface re-tags and communicates the packet if the reply message indicates that the packet does not violate a security condition.

Important technical advantages of certain embodiments of the present invention include traffic control at the VLAN level using a single port. This may provide a lower cost alternative to multiple-port devices used for inline intrusion detection.

Other important technical advantages of certain embodiments of the present invention include more efficient use of memory and bus resources. Re-tagging packets with a VLAN identifier can be performed at the physical interface. Thus, certain embodiments of the present invention allow a packet to be buffered and re-tagged without having to be processed and returned by a processor. This reduces the amount of packet communication between the interface and the processor.

Additional technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
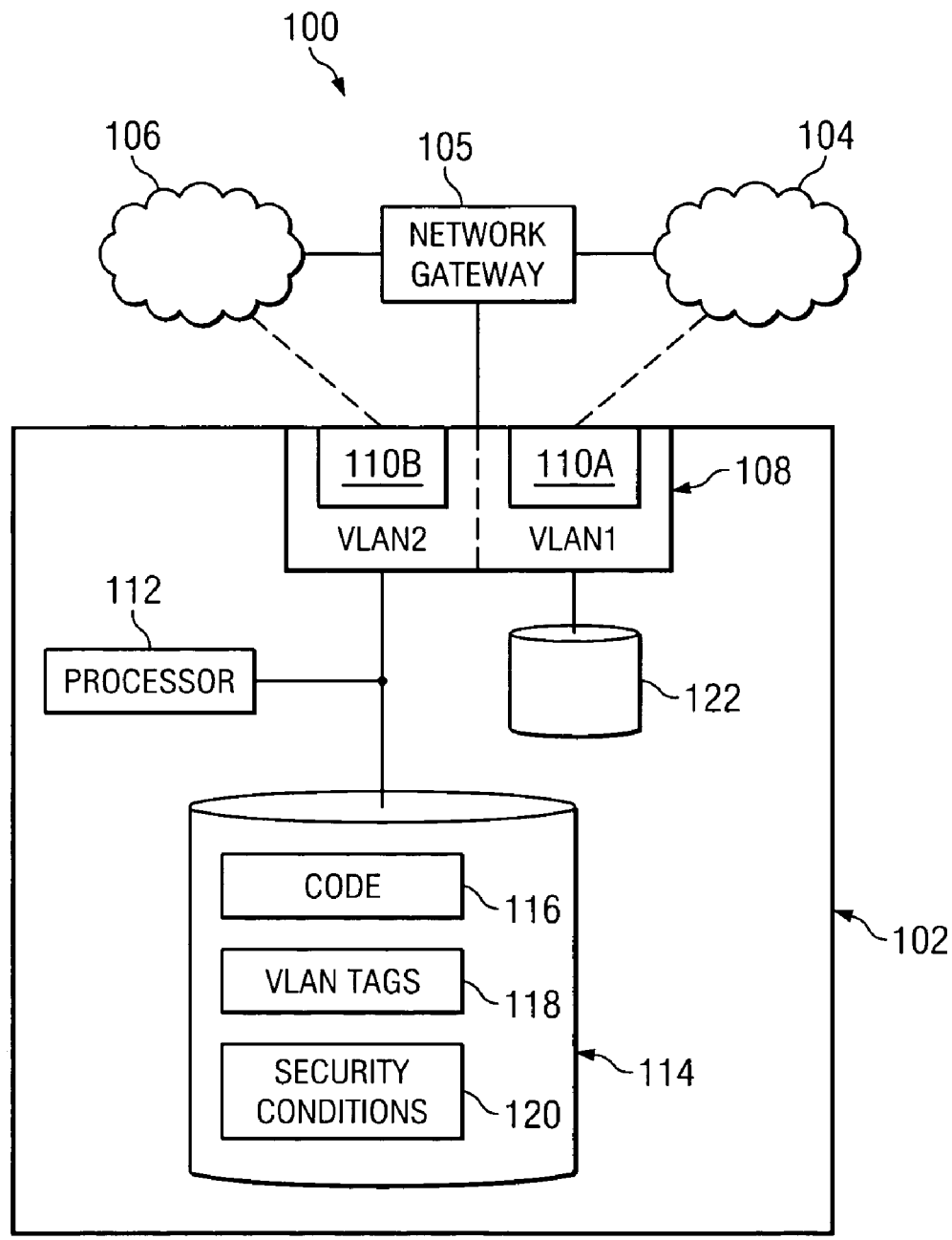
FIG. 1 illustrates a network security gateway using a single physical port.

FIG. 1 illustrates a computer system 100 that includes a network security gateway (NSG) 102 between an external network 104 and a protected network 106. Generally, NSG 102 receives information from external network 104 and analyzes the information to determine whether the information violates a security condition associated with protected network 106. If the security condition is violated, NSG 102 does not send the information to protected network 106. Otherwise, NSG 102 communicates the information to protected network 106.

External network 104 may include any collection of networked communication devices exchanging information. Networked communication devices may include hubs, routers, switches, gateways, personal computers, telephones, or any other device that can exchange information. Devices in external network 104 may exchange information in the form of packets, cells, frames, segments, or other portions of data (collectively referred to as "packets"). External network 104 may use any suitable medium or media of transmission, including wireline, wireless, or optical connections. Devices in external network 104 may communicate with one another using any number of suitable protocols, such as asynchronous transfer mode (ATM), transport control protocol/Internet protocol (TCP/IP), synchronous optical network (SONET), or Ethernet. External network 104 may also include the Internet.

Protected network 106 represents any collection of communication devices communicating in any suitable manner. In particular, protected network 106 may include any of the devices and communication media discussed in conjunction with external network 104. Protected network 106 may also use one or more suitable communication protocols, such as the ones described above. In particular, protected network 106 supports the use of virtual local area networks (VLANs).

A VLAN is a logical separation created between devices that share a physical network, so that devices on one VLAN cannot communicate with one another using the existing physical connections between the devices except through suitable network bridging hardware and/or software. VLANs are described in IEEE specification 802.1q.

Network gateway 105 represents any suitable hardware and/or software that communicates traffic received from external network 104 to protected network 106 and NSG 102. Traffic received from external network 104 is automatically tagged with an identifier for a first VLAN. Protected network 106 is configured to be on a second VLAN, so that it does not recognize traffic tagged with the identifier of the first VLAN. Thus, even though network gateway 105 may replicate the information to all of its ports, such as might take place in a network hub, the traffic will not be recognized by protected network 106 unless tagged with the proper VLAN identifier. Network gateway 105 includes a monitoring port that replicates the contents of incoming network traffic for NSG 102.

NSG 102 is a network security gateway that receives traffic from external network 104, analyzes the traffic to determine if it violates a security condition, and prevents information that violates the security conditions from reaching protected network 106. In the depicted embodiment, NSG 102 includes an interface 108, a processor 112, and a memory 114. Processor 112 may be any hardware and/or software components suitable for processing information, such as microprocessors, microcontrollers, or digital signal processors (DSPs).

Memory 114 is any suitable form of information storage, which may include magnetic media, optical media, removable media, local storage, remote storage, or other suitable component. In the depicted embodiment, memory 114 stores code 116, VLAN tags 118, and security conditions 120. Code 116 is executed by processor 112 to perform any suitable task associated with NSG 102. VLAN tags 118 are stored identifiers associated respectively with external network 104 and protected network 106. Security conditions 120 are policies that determine whether a packet may be forwarded from external network 104 to protected network 106. In one embodiment, a security condition 120 comprises an attack signature, i.e., a pattern of information that indicates that an incoming packet represents a hostile action directed at protected network 106. For example, hostile action may comprise uploading a virus to protected network 106. Another example may include a pattern exploiting the vulnerabilities of the protected resources such as, for example, buffer overflow. In another embodiment, security conditions 120 comprise firewall policies that prevent unauthorized users from accessing protected network 106 and/or prevent users of protected network 106 from accessing designated resources in external network 104. For example, security conditions 120 may comprise a domain name and IP address of external network 104 such that packets from the source address are discarded by NSG 102. Processor 112 compares information to security conditions 120 for detection.

Interface 108 represents a physical connection allowing communication between NSG 102 and devices on protected network 106 and external network 104. Communications with interface 108 take place at layer 2 of the Open Systems Interconnect (OSI) model. Interface 108 supports VLAN trunking. VLAN trunking allows interface 108 to recognize and communicate with multiple VLANS, each identified by a particular VLAN tag. Interface 108 therefore effectively includes multiple logical ports, each associated with a particular VLAN. Interface 108 may tag packets and change existing tags appropriately so that a packet is communicated to a particular VLAN.

In the depicted embodiment, interface 108 establishes a first VLAN for external network 104 and a second VLAN for protected network 106. Thus, interface 108 has two logical ports 110A and 110B. Information received from external network 104 is tagged with the VLAN tag associated with the first VLAN network, so it is not recognized by protected network 106. Once the information is determined to be safe for protected network 106, interface 108 may re-tag the information with the tag of the second VLAN. This effectively communicates information to protected network 106 using logical port 110B, even though interface 108 only includes one physical connection.

This re-tagging of the information from the tag of the first VLAN to the tag of the second VLAN provides the impression to networks 104 and 106 that they are directly connected on the same LAN. This apparent collapse of the two networks into one may also be extended to the use of the well-known spanning-tree protocol to prevent loops from occurring. Spanning-tree protocol is a link management protocol that provides path redundancy while preventing undesirable loops in a network, which may be caused by multiple active paths in a network. Loops are undesirable because of the associated potential for duplication of messages. Spanning-tree protocol addresses this problem according to well-known techniques. In particular messages, referred to as bridge protocol data units (BPDUs) are communicated within networks to provide information that is then used to avoid system loops. BPDUs are data messages that are exchanged across the switches within an extended LAN that uses a spanning tree protocol topology. BPDU packets contain information on ports, addresses, priorities and costs and ensure that the data ends up where it was intended to go. BPDU messages are exchanged across bridges to detect loops in a network topology. The loops are then removed by shutting down selected bridge interfaces and placing redundant switch ports in a backup, or blocked, state.

In the context where more than one NSG 102 exists, which may be desirable for both load sharing and redundancy reasons, a layer 2 loop could develop in the network, which will cause traffic storm and potential denial of service, bringing down the network. Thus, according to one aspect of the invention, the well-known spanning tree protocol may be run between networks 104 and 106, but with bridging the BPDUs between the two networks. Before the bridging occurs, however, the VLAN field of the BPDU is replaced with the outgoing VLAN. Thus, in the above described context of re-tagging of the information of the tag of the first VLAN to the tag of the second VLAN, spanning-tree protocol may be adopted to prevent loops in such a system by bridging BPDUs between the two parts 110A and 110B of interface 108. Information provided to NSG 102 has an associated BPDU, which includes a VLAN field. According to this aspect of the invention, once the information is determined to be safe for the protected distribution network (network 106 in the above example) the VLAN in the BPDU is modified from the source VLAN to the destination VLAN. This prevents creation of layer 2 loops in the networks which is desirable.

Interface 108 also includes a buffer 122. Buffer 122 represents local information storage at interface 108. Buffer 122 may include any suitable form of information storage, such as magnetic media, flash memory, optical media, or other type of information storage medium. Buffer 122 stores incoming information from external network 104 while the information is processed by components of NSG 102. In a particular embodiment, buffer 122 retains a copy of incoming traffic while the traffic is being analyzed by processor 112 to determine whether the incoming information violates a security condition 120.

In one example of a mode of operation, network gateway 105 receives traffic from external network 104 and tags the traffic with a first VLAN identifier. Network gateway 105 may then broadcast the traffic to all of its ports or may communicate it to NSG 102 only. Protected network 106 is configured to recognize only information on a second VLAN, so even if the packet is broadcast to protected network 106, it will not be recognized. NSG 102 receives the traffic at interface 108 and buffers the traffic in buffer 122. NSG 102 communicates a copy of the packet to processor 112, which analyzes the traffic to determine whether it violates a security condition. Processor 112 then returns a message to NSG 102 indicating whether the packet violates a security condition. If the packet violates a security condition, then NSG 102 discards the packet from buffer 112. Otherwise, NSG 102 may re-tag the packet with a second VLAN identifier and communicate the packet back to network gateway 105, which in turn communicates the packet to protected network 106.

One technical advantage of certain embodiments of the present invention is the opportunity to conserve memory and bus resources in NSG 102. Since VLAN re-tagging may be performed at interface 108, interface 108 does not require additional processing resources to move a packet from one VLAN to another. Conversely, network protection systems that operate at higher layers, such as firewalls, typically require network address translation or other similar adjustments to packet header information. Such systems must forward a packet to the appropriate processing resource using an internal bus, and then receive a returned packet suitably modified for communication to the network protected by these systems. In contrast to these conventional systems, interface 108 may receive a reply message, which may be as short as a single bit, that indicates whether or not the packet should be communicated to protected network 106. Thus, NSG 102 may use less internal bus resources and also reduce the load of buffer 122, which need not store both incoming packets and packets returned by processor 112.

Figure 2:
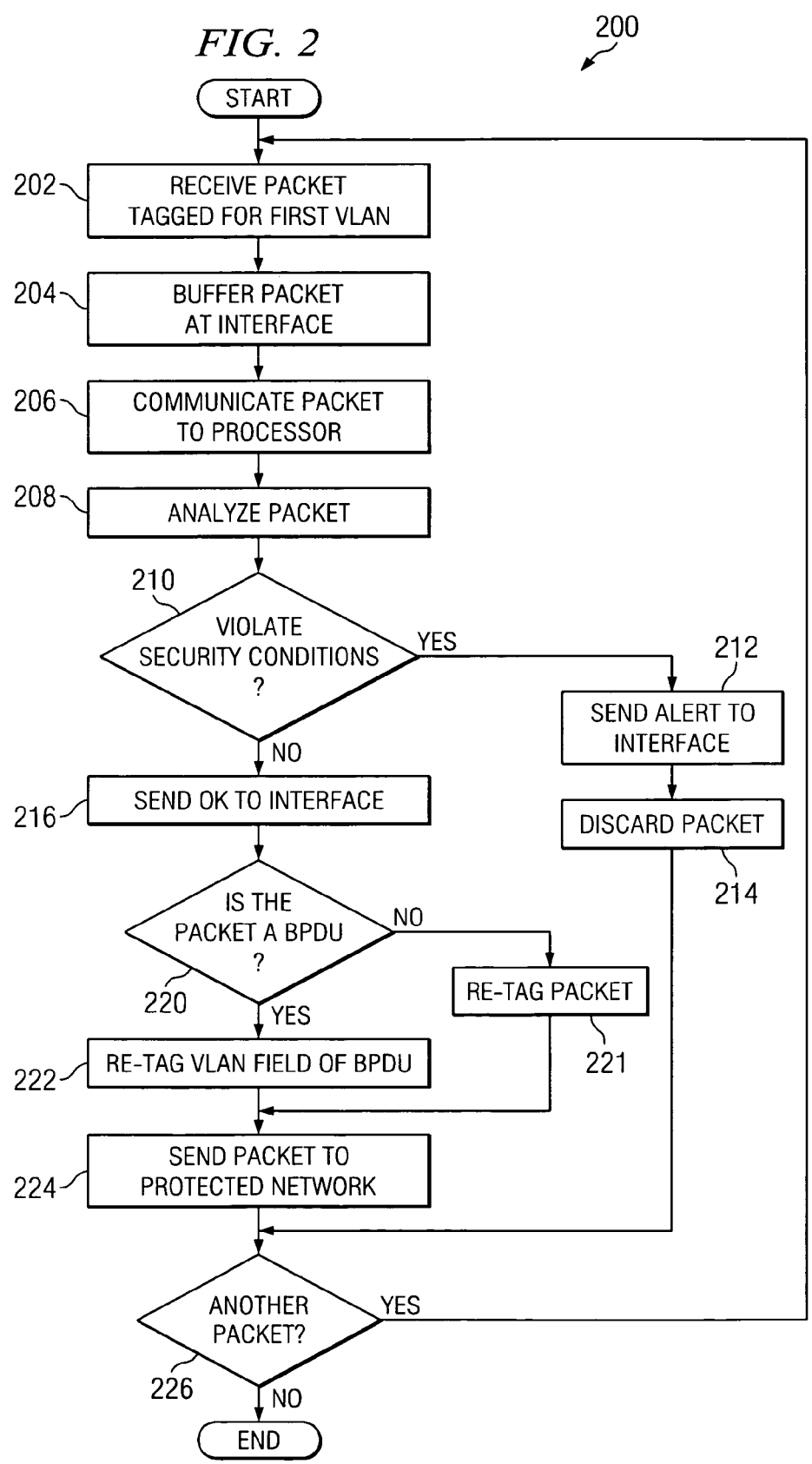
FIG. 2 illustrates a flow chart showing an example method of operation for the network security gateway of FIG. 1.

FIG. 2 is a flow chart 200 illustrating an example method of operation for NSG 102. NSG 102 receives a packet tagged for a first VLAN at step 202. NSG 102 buffer the packet at interface 108 at step 204. Interface 108 communicates a copy of the packet to processor 112 at step 206.

Processor 112 analyzes the packet by comparing the packet to security conditions 120 at step 208. If a security condition is violated at decisional step 210, then processor 112 sends an alert to interface 108 at step 212. Interface 108 then discards the packet from buffer 122 at step 214. If a security condition is not violated, processor 112 sends an OK message to interface 108 at step 216. At step 220, it is determined whether the packet is a BPDU packet. If so, the VLAN field in the associated BPDU is replaced with the VLAN identifier for the second VLAN associated with the protected network 106 at step 222. As described above, in the context where more than one NSG exists, which may be desirable for both load sharing and redundancy reasons, a layer 2 loop could develop in the network, which will cause traffic storm and potential denial of service, bringing down the network. Thus, according to one aspect of the invention, the well-known spanning tree protocol may be run between networks 104 and 106, but with bridging the BPDUs between the two networks. Before the bridging occurs, however, the VLAN hold of the BPDU is replaced with the outgoing VLAN. If the packet is not a BPDU packet, interface 108 re-tags the packet with the identifier for the second VLAN associated with protected network 106 at step 221. Interface 108 then communicates the packet to protected network 106 at step 224. The method may be repeated as long as there are incoming packets, as shown by decision step 226.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
    receiving a packet at a physical interface of a network security gateway, wherein the packet is tagged with a first virtual local area network (VLAN) identifier associated with an external network;
    communicating a copy of the packet to a first processor;
    analyzing the copy of the packet at the first processor to determine whether the packet violates a security condition;
    communicating a reply message from the first processor to the interface indicating whether the packet violates a security condition; and
    if the packet does not violate a security condition:
        at the physical interface, re-tagging the packet with a second VLAN identifier associated with a protected network; and
        communicating the re-tagged packet to the protected network.

2. The method of claim 1, wherein the security condition comprises an attack signature.

3. The method of claim 1, wherein the security condition comprises a firewall policy.

4. The method of claim 1, further comprising:
    receiving the packet from the external network at a network gateway;
    tagging the packet with the first VLAN identifier at the network gateway; and
    communicating the packet to the interface.

5. The method of claim 4, wherein the step of communicating the re-tagged packet to the protected network comprises:
    communicating the re-tagged packet to a first port of the network gateway; and
    communicating the re-tagged packet to the protected network using a second port of the network gateway.

6. The method of claim 4, wherein communicating the packet to the interface comprises:
    generating a copy of the packet for each of a plurality of ports of the network gateway, wherein one of the ports is coupled to the interface; and
    communicating one of the copies of the packet from each of the ports.

7. The method of claim 1, wherein a size of the reply message is less than the size of the packet.

8. The method of claim 1, and further comprising modifying a VLAN field of a bridge protocol data unit (BPDU) associated with the packet to store the second VLAN identifier if the packet does not violate a security condition.

9. Logic embodied in a computer-readable storage medium operable to perform steps comprising:
    receiving a packet at a physical interface of a network security gateway, wherein the packet is tagged with a first virtual local area network (VLAN) identifier associated with an external network;
    communicating a copy of the packet to a first processor;

analyzing the copy of the packet at the first processor to determine whether the packet violates a security condition;

communicating a reply message from the first processor to the interface indicating whether the packet violates a security condition; and if the packet does not violate a security condition:
  at the physical interface, re-tagging the buffered copy of the packet with a second VLAN identifier associated with a protected network; and
  communicating the re-tagged packet to the protected network.

10. The logic of claim 9, wherein the security condition comprises an attack signature.

11. The logic of claim 9, wherein the security condition comprises a firewall policy.

12. The logic of claim 9, further operable to perform steps further comprising:
  receiving the packet from the external network at a network gateway;
  tagging the packet with the first VLAN identifier at the network gateway; and
  communicating the packet to the interface.

13. The logic of claim 12, wherein the step of communicating the re-tagged packet to the protected network comprises:
  communicating the re-tagged packet to a first port of the network gateway; and
  communicating the re-tagged packet to the protected network using a second port of the network gateway.

14. The logic of claim 12, wherein the step of communicating the packet to the interface comprises:
  generating a copy of the packet for each of a plurality of ports of the network gateway, wherein one of the ports is coupled to the interface; and
  communicating one of the copies of the packet from each of the ports.

15. The logic of claim 9, wherein a size of the reply message is less than the size of the packet.

16. The logic of claim 9, further operable to perform the step of modifying a VLAN field of a bridge protocol data unit (BPDU) associated with the packet to store the second VLAN identifier if the packet does not violate a security condition.

17. A system, comprising:
  means for receiving a packet at a physical interface of a network security gateway, wherein the packet is tagged with a first VLAN identifier associated with an external network;
  means for communicating a copy of the packet to a first processor;
  means for analyzing the copy of the packet at the first processor to determine whether the packet violates a security condition;
  means for communicating a reply message from the first processor to the interface indicating whether the packet violates a security condition;
  means at the physical interface operable for re-tagging the buffered copy of the packet with a second VLAN identifier associated with a protected network if the packet does not violate a security condition; and
  means for communicating the re-tagged packet to the protected network.

18. The system of claim 17, wherein the security condition comprises an attack signature.

19. The system of claim 17, wherein the security condition comprises a firewall policy.

20. The system of claim 17, further comprising:
  means for receiving the packet from the external network at a network gateway;
  means for tagging the packet with the first VLAN identifier at the network gateway; and
  means for communicating the packet to the interface.

21. The system of claim 17, and further comprising means for modifying a VLAN field of a bridge protocol data unit (BPDU) associated with the packet to store the second VLAN identifier if the packet does not violate a security condition.

22. A system, comprising:
  an interface operable to:
    receive a packet, wherein the packet is tagged with a first virtual local area network (VLAN) identifier associated with an external network;
    communicate a copy of the packet to a processor;
    re-tag the packet with a second VLAN identifier associated with a protected network; and
    communicate the packet to the protected network; and
  the processor operable to:
    analyze the copy of the packet to determine if it violates a security condition; and
    communicate a reply message to the interface indicating whether the packet violates a security condition, wherein the interface re-tags and communicates the packet if the reply message indicates that the packet does not violate a security condition.

23. The system of claim 22, wherein the security condition comprises an attack signature.

24. The system of claim 22, wherein the security condition comprises a firewall policy.

25. The system of claim 22, further comprising a network gateway operable to:
  receive the packet from the external network;
  tag the packet with the first VLAN identifier at the network gateway; and
  communicate the packet to the interface.

26. The system of claim 25, wherein:
  the interface is further operable to communicate the re-tagged packet to a first port of the network gateway; and
  the network gateway is further operable to communicate the re-tagged packet to the protected network using a second port of the network gateway.

27. The system of claim 25, wherein the network gateway is further operable to:
  generate a copy of the packet for each of a plurality of ports of the network gateway, wherein one of the ports is coupled to the interface; and
  communicate one of the copies of the packet from each of the ports.

28. The system of claim 22, wherein a size of the reply message is less than the size of the packet.

29. The system of claim 22, wherein the processor is further operable to modify the field of a VLAN field of a bridge protocol data unit (BPDU) associated with the packet to store the second VLAN identifier if the packet does not violate a security condition.

* * * * *